United States Patent
Tang et al.

(10) Patent No.: US 9,063,770 B2
(45) Date of Patent: Jun. 23, 2015

(54) SYSTEM AND METHOD FOR MOBILE PLATFORM VIRTUALIZATION

(71) Applicant: TCL RESEARCH AMERICA INC., Santa Clara, CA (US)

(72) Inventors: Jun Tang, Santa Clara, CA (US); Haohong Wang, Santa Clara, CA (US)

(73) Assignee: TCL RESEARCH AMERICA INC., Santa Clara, CA (US)

(*) Notice: Subject to any disclaimer, the term of this patent is extended or adjusted under 35 U.S.C. 154(b) by 300 days.

(21) Appl. No.: 13/710,486

(22) Filed: Dec. 11, 2012

(65) Prior Publication Data

US 2014/0164750 A1 Jun. 12, 2014

(51) Int. Cl.
- G06F 9/00 (2006.01)
- G06F 9/24 (2006.01)
- G06F 15/177 (2006.01)
- G06F 9/455 (2006.01)

(52) U.S. Cl.
CPC .. *G06F 9/45558* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 8,310,394 B2* | 11/2012 | Kim et al. | | 342/357.31 |
| 8,527,787 B2* | 9/2013 | Karkaria et al. | | 713/300 |
| 2008/0028474 A1* | 1/2008 | Horne et al. | | 726/27 |
| 2009/0249051 A1* | 10/2009 | TeNgaio et al. | | 713/1 |
| 2011/0145591 A1* | 6/2011 | Grzybowski | | 713/189 |

OTHER PUBLICATIONS

Choudhury et al, The Mobile Sensing Platform: An Embedded Activity Recognition System, 2008, IEEE CS, Apr.-Jun. 2008, p. 32-40.*
Chong and Kumar, Sensor Networks: Evolution, Opportunities, and Challenges, Aug. 2003, Proceedings of the IEEE, vol. 91, No. 8, p. 1247-1255.*

* cited by examiner

*Primary Examiner* — Kim Huynh
*Assistant Examiner* — Siamak S Hefazi
(74) *Attorney, Agent, or Firm* — Anova Law Group, PLLC (57) ABSTRACT

A method for a mobile platform containing a mobile terminal having an operating system includes initializing a plurality of user environments (UEs) on the mobile terminal over the operating system, including a current UE running on the mobile terminal. The plurality of UEs are capable of being switched among one another based on one or more of predetermined conditions without changing the operating system. The method also includes collecting sensing data on certain parameters associated with operation of the mobile terminal, and processing the sensing data to indicate at least one of the predetermined conditions. Further, the method includes determining whether the current UE suits the at least one of the predetermined conditions indicated by processing the sensing data and, when the current UE does not suit the condition of the mobile terminal, switching the current UE to a desired UE from the plurality of UEs.

18 Claims, 5 Drawing Sheets

SYSTEM AND METHOD FOR MOBILE PLATFORM VIRTUALIZATION

FIELD OF THE INVENTION

The present invention relates to the field of user interface technologies and, more particularly, to techniques for mobile platform virtualization.

BACKGROUND

Existing smartphones are built on various mobile operating systems (Android, iOS, Windows Mobile, etc), with functionalities like media players, digital/video cameras, touch screens, web browsers, GPS navigation, and high-speed data access provided by Wi-Fi and wireless networks. A mobile operating system on a smartphone provides well-established application programming interfaces (APIs) and hundreds of thousands third-party applications can run on the smartphone, improving people's daily life.

Smartphones are also getting more powerful in terms of processing speed and computing capacity, which may enable advanced mobile processing. However, how to integrate advanced mobile processing into other technologies, such as sensing and networking technologies, is still under development.

The advanced mobile processing also enables the adaptation of virtualization technology into mobile space. However, existing solutions often focus on getting multiple instances of different or the same operating system images which are preconfigured running on the same mobile device. Switching between the instances of operating system images is controlled by user and is often a manual process, while mobile sensing development has been at application level, targeting specific applications within the same environment.

The disclosed methods and systems are directed to solve one or more problems set forth above and other problems.

BRIEF SUMMARY OF THE DISCLOSURE

One aspect of the present disclosure includes a method for a mobile platform containing a mobile terminal having an operating system. The method includes initializing a plurality of user environments (UEs) on the mobile terminal over the operating system, including a current UE running on the mobile terminal. The plurality of UEs are capable of being switched among one another based on one or more predetermined conditions without changing the operating system. The method also includes collecting sensing data on certain parameters associated with operation of the mobile terminal, and processing the sensing data to indicate at least one of the predetermined conditions of the mobile terminal. Further, the method includes determining whether the current UE suits the at least one of the predetermined conditions of the mobile terminal indicated by processing the sensing data and, when the current UE does not suit the condition of the mobile terminal, switching the current UE to a desired UE from the plurality of UEs.

Another aspect of the present disclosure includes a mobile platform. The mobile platform includes a mobile terminal having a processor and an operating system running on the processor. The processor is configured to initialize a plurality of user environments (UEs) on the mobile terminal over the operating system, including a current UE running on the mobile terminal. The plurality of UEs are capable of being switched among one another based on one or more predetermined conditions without changing the operating system. The processor is also configured to collect sensing data on certain parameters associated with operation of the mobile terminal and to process the sensing data to indicate at least one of the predetermined conditions of the mobile terminal. Further, the processor is configured to determine whether the current UE suits the at least one of the predetermined conditions of the mobile terminal indicated by processing the sensing data and, when the current UE does not suit the condition of the mobile terminal, to switch the current UE to a desired UE from the plurality of UEs.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
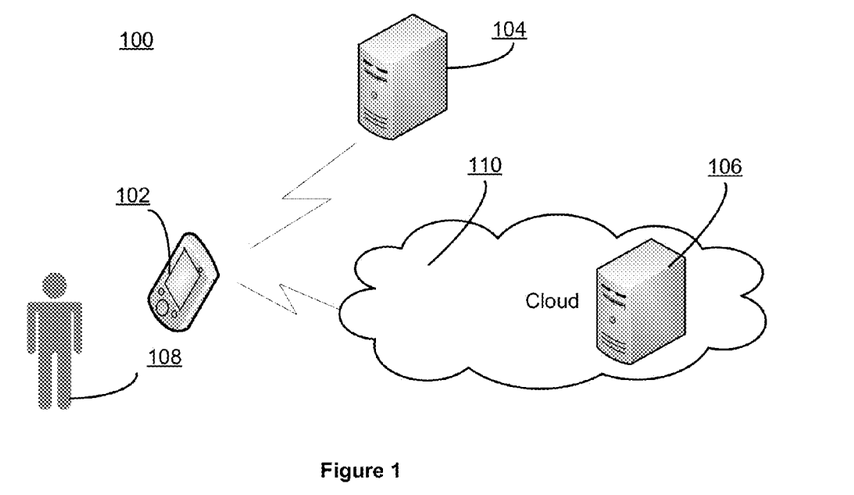
FIG. 1 illustrates an exemplary mobile virtualization system consistent with the disclosed embodiments.

FIG. 1 illustrates an exemplary mobile virtualization system 100 incorporating certain embodiments of the present invention. As shown in FIG. 1, mobile virtualization system 100 includes a mobile terminal 102, a server 104, a cloud 110, a server 106, and a user 108. Certain device(s) may be omitted and other devices may be added.

Mobile terminal 102 may include any appropriate type of mobile device, such as one or more of smartphones, tablets, notebooks, personal computers, personal digital assistants (PDAs), mobile phones, or other mobile devices. Mobile terminal 102 may also include various sensors to collect data on mobile terminal, on environment of the mobile terminal, and/or user 108 of the mobile terminal, etc. For example, mobile terminal 102 may include sensors for location (GPS), movement (accelerometer), temperature, atmospheric pressure, etc.

In addition, mobile terminal 102 can also obtain sensing information from other devices within the mobile terminal 102, such as images from a camera, sounds from surroundings, network information, whether the phone is plugged into power, application using patterns, etc. The sensing data from the sensors and sensing data obtained can be used to discover the environment and other useful information about the user/mobile terminal 102. More particularly, the sensing data may indicate certain conditions of the mobile terminal 102 or user 108 such that configurations of the mobile terminal 102 may be adjusted based on the certain condition.

Server 104 and server 106 may include any appropriate type of computer systems configured to provide server functionalities. Although server 104 or server 106 is shown in a single computer configuration, more computers or server clusters can be included in server 104 or server 106. Further, the server 104 may be in a non-cloud configuration, while server 106 may be in a cloud configuration. Server 104 and server 106 may have similar functionalities and may be present at the same time or may be present one without the other.

Cloud 110 may refer to a cloud computing environment, i.e., the use of computing resources (hardware and software) that are delivered as a service over a network infrastructure (e.g., the Internet). Cloud 110 may include any private cloud configuration and/or public cloud configuration. Cloud 110 may include various servers (i.e., server services), such as a server 106 configured to provide mobile platform virtualization functionalities. Any appropriate types of servers may be included.

Cloud-based services in cloud 110 may be delivered to mobile terminal 102 via high speed data connections, such as 3G, 4G-LTE and WiFi networks. Data collected on mobile terminal 102 may be forwarded to cloud 110 (e.g., server 106 in cloud 110) as input data to various services provided by server 106. For example, the data collected on mobile terminal 102 may include mobile sensing data, and the sensing data may be forwarded to server 106 as input data.

Figure 2:
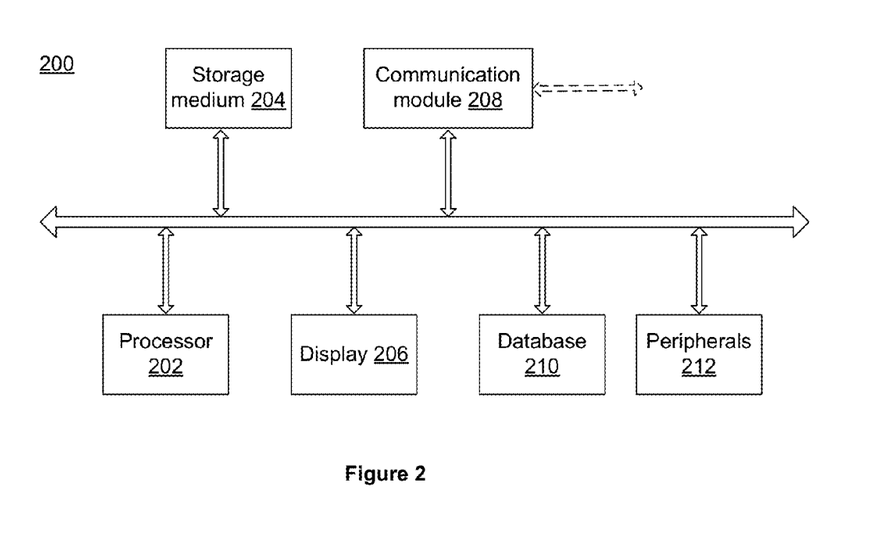
FIG. 2 illustrates an exemplary computing system consistent with the disclosed embodiments.

Mobile terminal 102, server 104, and/or server 106 may be implemented on any appropriate computing platform. FIG. 2 shows a block diagram of an exemplary computing system 200 capable of implementing mobile terminal 102, server 104, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as a keypad, keyboard, and mouse, etc. The various sensors may include temperature sensors, location sensors (e.g., GPS), movement sensors (accelerometer), atmospheric or pressure sensors, sound sensors, etc. The communication module 208 may include certain network interface devices for establishing connections through communication networks, such as wired or wireless networks. Database 210 may include one or more databases for storing certain data and for performing certain operations on the stored data, such as database searching.

Figure 3:
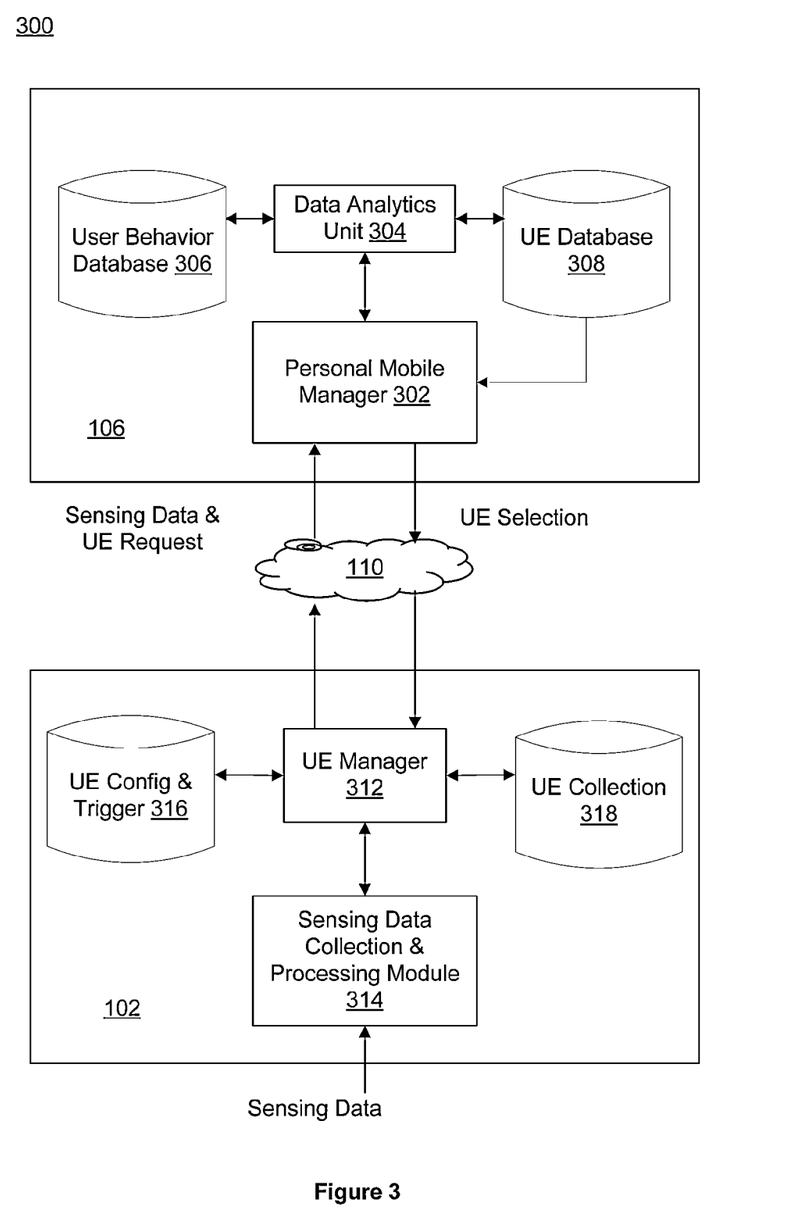
FIG. 3 illustrates an exemplary mobile platform consistent with the disclosed embodiments.

Returning to FIG. 1, in operation, the user 108 may use mobile terminal 102 to interact with a large number of devices and servers to obtain information, to do business, to perform searching, or to conduct other online and offline activities. To provide desired user experience, the mobile virtualization system 100 provides a computing structure that seamlessly integrates mobile sensing, endpoint OS virtualization, user behavior analysis, mobile management and recommendation into a general framework, a so-called cloud-based mobile platform. Using this mobile platform or framework, mobile terminals' front end sensing and servers' backend computing capability can be coupled together through the operating system (OS) and user environment (UE) virtualization. FIG. 3 illustrates an exemplary mobile platform 300 consistent with the disclosed embodiments.

As shown in FIG. 3, mobile terminal 102 and server 106 are coupled through cloud 110 (i.e., server 106 is provided by cloud 110). Certain modules or components are configured in the mobile terminal 102 and server 106 to provide various functionalities to support the mobile platform 300. Although a single mobile terminal and a single server are used for illustrative purposes, any number of mobile terminals and servers can be included.

Mobile terminal 102 may include a sensing data collection and processing module 314, a UE configuration and trigger module/database 316, a UE manger 312, and a UE collection module/database 318. Server 106 may include a personal mobile manager 302, a user behavior module/database 306, a data analytics unit 304, and a UE module/database 308. Certain modules may be omitted and other modules may be added. Further, these modules may be implemented by software running on processors in the mobile terminal 102 and/or server 106, hardware, or a combination of software and hardware.

The sensing data collection and processing module 314 (or simply processing module 314) collects and processes sensing data from devices in the mobile terminal 102 (e.g., various sensors) and/or from software running on the mobile terminal 102. The collected sensing data and/or processed sensing data is sent to UE manager 312. Alternatively, the collected sensing data and/or processed sensing data is relayed to server 106 for further processing.

The UE configuration and trigger module 316 (or simply UE configuration module 316) may store information on UE operations, such as the UE configuration and UE trigger. That is, information about how a user environment (UE) should be run and when the UE is to run is stored in the UE configuration module 316. A user environment (UE), as used herein, may include a part of operating system, bundled applications, application configurations, and user interfaces, etc., for setting up a software environment for user 108 to use. The information in the UE configuration module 316 can be from server 106, pre-configured in a UE software image, or manually configured by user 108.

The UE collection module 318 may store one or more UEs ready to be run on mobile terminal 102. Different types of mobile terminal 102 may be configured differently. Certain mobile terminals may allow a single UE to run at a time, while certain other mobile terminals may allow multiple UEs to run at same time or different time. In certain embodiments, mobile terminal 102 allows running of one or more UEs and a collection of ready-to-run UEs are stored in UE collection module/database 318.

The UE manager 312 is responsible for controlling and coordinating UE operations on mobile terminal 102. For example, UE manager 312 on the mobile terminal 102 may select a UE from the UEs stored in the UE collection module 318 and may launch the selected UE for user 108. The UE manager 312 may request a new UE from server 106 and store the new UE to be used immediately or next time. Further, the UE manager 312 may also receive collected and/or processed sensing data from the processing module 314 and may, based on sensing data and the configuration information from the UE configuration module 316, select a desired UE to launch or start. In addition, the UE manager 312 may also relay processed sensing data to server 106 for further processing.

Figure 4:
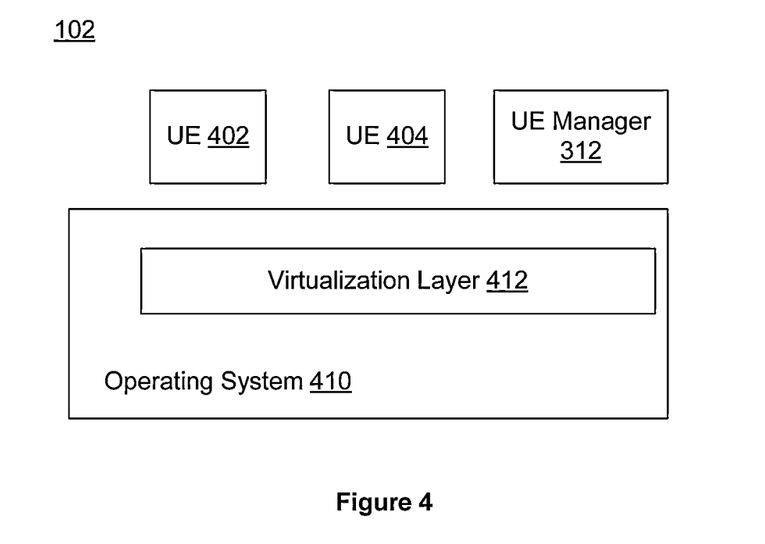
FIG. 4 illustrates an exemplary UE virtualization structure on a mobile terminal consistent with the disclosed embodiments.

Further, UE manager 312 may also be used to provide UE virtualization functionalities on mobile terminal 102. FIG. 4 illustrates an exemplary UE virtualization structure on mobile terminal 102.

As shown in FIG. 4, mobile terminal 102 may include an operating system 410. The operating system 410 may include any appropriate type of operating system configured to run on a mobile terminal, such as a smart phone. For example, operating system 410 may be a Windows system, Android system, iOS, Linux, or Firefox OS, etc.

The operating system 410 may include a virtualization layer 412, and UE 402 and UE 404 can be used through the virtualization layer 412 independent of hardware configurations of mobile terminal 102 and/or operating system on mobile terminal 102. That is, the hardware components on are virtualized through the virtualization layer 412 such that more than one UEs can share the same hardware component. Although two UEs are shown for illustrative purposes, any number of UEs may be included.

A user environment (e.g., UE 402, UE 404) may comprise a part of operating system that makes the user environment an independent environment to run applications, independent from other user environments and applications running in other user environments. For example, a first user environment in a Linux-based design may include complete Android components so that the first user environment can run in parallel with a second Android-based user environment because the first user environment does not share with the second Android user environment.

Also for example, because one UE is independent from another, Android may run in one UE while Firefox may run in another UE, and both UEs are supported by a shared Linux under the UEs. Further, as previously described, UE manager 312 may be configured to create and manage the UE instances. For example, UE manager 312 may launch one or more UEs based on certain criteria and may also maintain and control the UEs during run-time, such as UE updating, etc.

Because the UEs are provided based on the virtualization layer 412, the entire operating system 410 does not need to be virtualized (e.g., at kernel layer). Instead, the virtualization layer 412 enables multiple UEs to run on the same mobile terminal, so-called just-needed-device-virtualization. Further, the virtualization layer 412 may be by-passed to allow non-virtualization for certain mobile terminals, where such mobile terminals can run one UE at a time.

Further, start and stop of the multiple UEs can be controlled by the UE manager 312. For example, a UE can be stopped before launching another selected UE when triggered to do so by the mobile sensing data. Less memory may need to be used because each UE has its memory footprint, making the UE virtualization structure on mobile terminal 102 practical.

Figure 5:
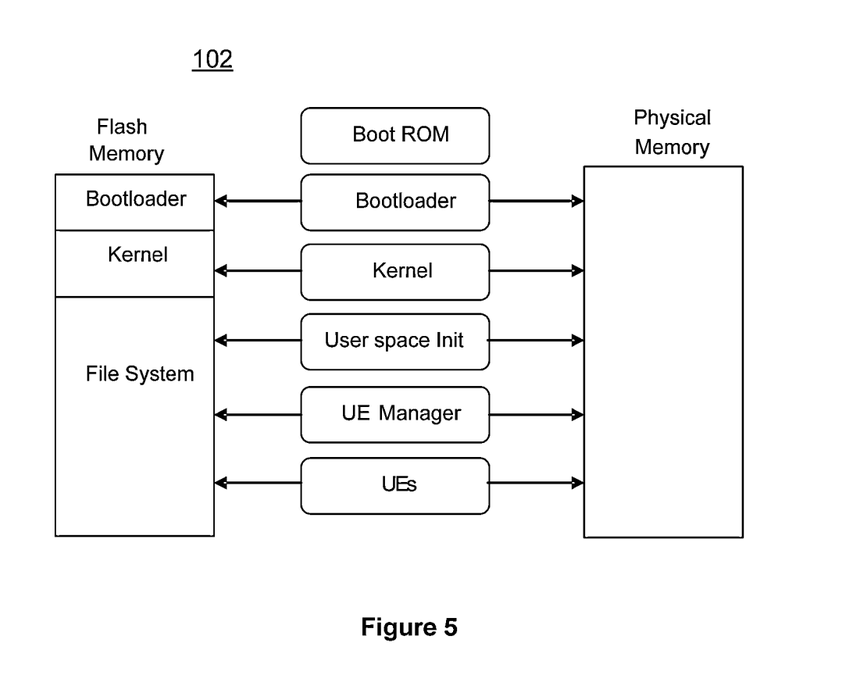
FIG. 5 illustrates an initialization process of the UE virtualization structure consistent with the disclosed embodiments.

FIG. 5 illustrates an initialization process of the UE virtualization structure on mobile terminal 102. As shown in FIG. 5, mobile terminal 102 may include a flash memory module and a physical memory (e.g., RAM) used together with the processor for running the UE virtualization structure. That is, the program code for the UE virtualization structure may be stored in the flash memory and may be loaded into RAM during operation. Software modules for the UE virtualization structure may then be initiated and started from bottom layers to the upper or application layers.

For example, when mobile terminal 102 is power-on or after reset, a boot ROM may be used for the processor to run a boot sequence to load into memory a Bootloader module from the flash memory and to execute the Bootloader to load software images of the operating system and UEs, etc. Alternatively, the Bootloader can also be executed from the flash memory. The kernel of the operating system then is started and configured from the RAM or from the flash.

After the kernel is started, a user space initialization process may be started, which may set up the software environment on mobile terminal 102 for one or more users. At the end of the user space initialization process, UE manager 312 may be initialized and started to manage UE initialization.

For example, the UE manager 312 may start a UE from a collection of UEs based on certain criteria, such as configuration and/or mobile sensing data. If a mobile terminal may have a single display with limited screen size, the UE manager 312 may allow only one UE to have control of the screen display and/or input. However, the UE manager 312 may allow other hardware resources to be shared among UEs depending on the configuration.

Returning to FIG. 3, as the server-side configuration of the mobile virtualization system 100 include server 106 coupled to mobile terminal 102 through cloud 110. The server 106 may include personal mobile manager 302, user behavior module/database 306, data analytics unit 304, and UE module/database 308, etc.

The personal mobile manager 302 (or simply mobile manager 302) may be configured to interface with the UE manager 312 on the mobile terminal 102. The mobile manager 302 may receive the sensing data from or relayed from the UE manager 312, and may also send the sensing data to the data analytics unit 304 for processing and get back processing results from the data analytics unit 304.

The mobile manager 302 may also receive a UE request from the UE manager 312, and the UE request may include a request for a new UE or an updated UE. After receiving the UE request from the UE manager 312 on the mobile terminal 102, the mobile manager 302 may dynamically construct a UE based on the UE request or may select a desired UE from UE database 308. The mobile manager 302 may also send the UE selection to the UE manager 312. Further, the mobile manager 302 may also manage other aspects of the mobile terminals and/or other mobile devices.

The data analytics unit 304 may receive the sensing data and/or other requests from the mobile manager 302 and provides various analyses. For example, the data analytics unit 304 may use the user behavior database 306 to perform user behavior learning/modeling. The data analytics unit 304 may also determine and recommend run-time environment for mobile terminals, such as UEs, operating systems, applications, services, and other components based on user-specific information.

The user behavior database 306 may include a learned database to match mobile sensing data processing to the UE database 308. The user behavior database 306 may be updated during the run-time in an adaptive mode to be perfected in the process. Further, the user behavior database 306 might not be specific to one user, thus no personal and private information is stored. However, the user behavior database 306 may receive the user's input or assistance, such as label of an event, which may be helpful for the user behavior analysis.

Further, the UE database 308 may include a large number and wide range of UEs with different applications, different user interface designs, different system settings, different application configurations. That is, the UE database 308 may include a collection UEs configured for all occasions and for a variety of mobile terminal. The UE database 308 may provide one or more requested UEs to data analytics unit 304 and/or the mobile manager 302.

Figure 6:
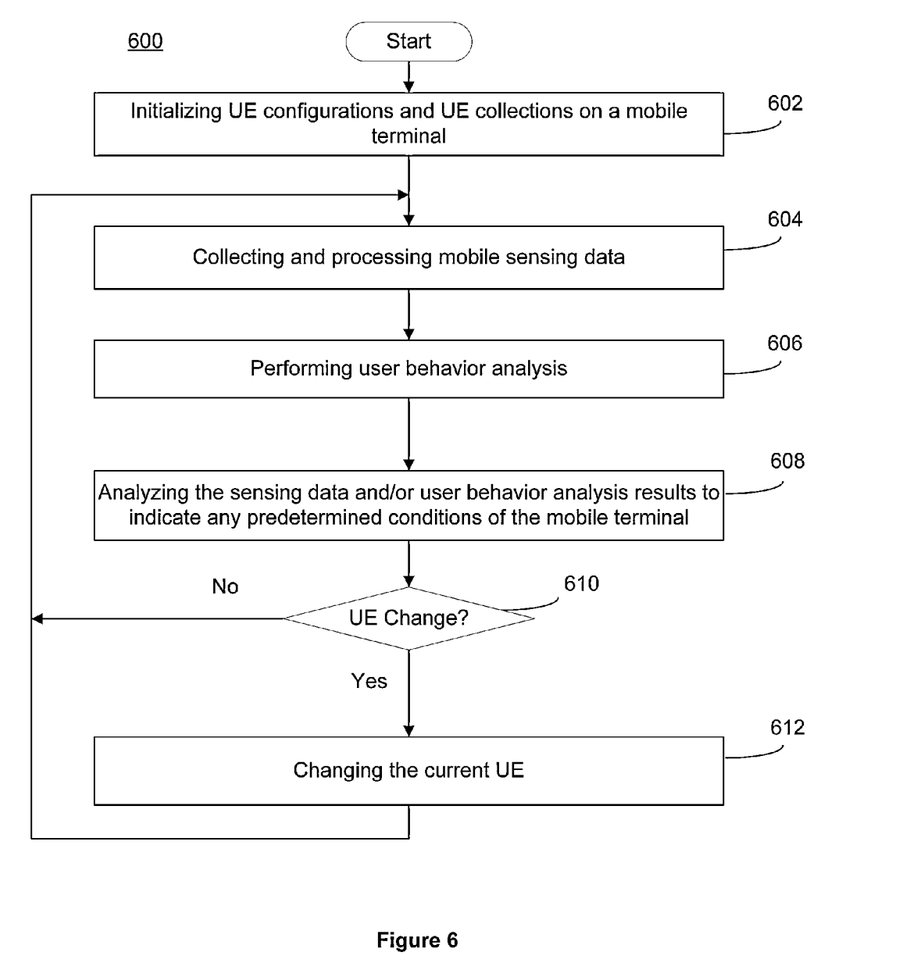
FIG. 6 illustrates an exemplary virtualized mobile platform operation process consistent with the disclosed embodiments.

During operation, both mobile-side and server-side interact with each other to implement the virtualized mobile platform as shown in FIG. 3. In certain embodiments, the mobile-side (e.g., UE manager 312) may also work without server-side support at a reduced capability, where, with multiple pre-loaded UEs, UE manager 312 can switch to a desired UE depending on existing UE configuration and the collected/processed sensing data. In certain other embodiments, the UE manager 312 may forward the sensing data to server-side and to request a new UE from the server-side when the conditions indicated by the sensing data desire a new UE. FIG. 6 illustrates an exemplary virtualized mobile platform operation process 600 consistent with the disclosed embodiments.

As shown in FIG. 6, at the beginning, the UE configurations and UE collections on the mobile terminal are initialized (602). For example, UE switching triggering rules may be defined as part of the UE configurations, i.e., whether a pre-determined condition or conditions on the mobile terminal require switching the current UE to a new UE. The UE collections may include UEs can be configured to run on the mobile terminal based on the UE configurations, and these UEs may be run one at a time or simultaneously.

For example, a user may have two UEs in the UE collection, one for work and the other for home. The work-place UE may be configured for the work environment to have email, office and other work related applications installed, to have extra security, and/or able to be deployed and managed from server-side. The work-place UE may be managed by the server-side for high reliability.

On the other hand, the home-place UE may be unmanaged from the server-side, with all the applications and games installed by user for home use. The UE configurations and/or the UE collections may be pre-loaded in the mobile terminal or may be dynamically loaded into mobile terminal at the time of initialization. Other configurations may also be used.

Further, during operation of mobile terminal by the user, mobile sensing data is collected and processed (604). A variety of mobile sensing data may be collected from various sensors, other devices, and software programs, and the mobile sensing data may be processed on mobile-side and/or on server-side. In one embodiment, the mobile terminal may detect a scene of the mobile terminal. For example, the mobile terminal may detect presence of a work-place WiFi access point SSID and the processed sensing data may indicate the mobile terminal is currently in a work place, or the mobile terminal may detect a home WiFi access point SSID and the processed sensing data may indicate the mobile terminal is currently at home. In another embodiment, the mobile terminal may detect a location of the mobile terminal. For example, the mobile terminal may detect that the mobile terminal is in a flying airplane.

Further, when the mobile-side is supported or managed by the server-side, user behavior analysis may be performed by server 106 or by cloud 110 (606). That is, a cloud-based user behavior learning may be performed based on the sensing data and data analytics. The results of the user behavior learning may be provided to the server 106 and/or the mobile terminal 102.

Further, the sensing data and/or the results of the user behavior analysis may be analyzed to indicate one or more predetermined conditions of the mobile terminal (608). Based on the predetermined conditions, it may be determined whether the current UE needs to be changed (e.g., switched or updated) to a desired UE or UEs (610).

For example, if the sensing data indicates that the mobile terminal is in a work place and the current UE is the home-place UE, it may be determined that the current UE needs to be switched to the work-place UE. Or if the sensing data indicates that the mobile terminal is at home and the current UE is the work-place UE, it may also be determined that the current UE needs to be switched to the home-place UE.

Also for example, if the sensing data indicates that the mobile terminal is in an airplane and the current UE is a normal UE, it may be determined that the current UE needs to be switched to an airplane UE, such as a preloaded UE that has wireless turned off, a user interface without presence of browser and any applications relying on data connection, but with games, music, books, and other things desired for airplane journey.

If it is determined the current UE needs to be switched or updated (610; Yes), the current UE may be automatically switched to a desired UE. For example, after determining that the current home-place UE needs to be switched to a work-place UE, the work-place UE is automatically loaded onto the mobile terminal, and vice versa. Alternatively, the user may be prompted to confirm the switch of the current UE to a desired UE.

Also for example, after determining that a normal UE needs to be switched to an airplane UE without a wireless network, the pre-loaded airplane UE may be started to replace the current UE.

Further, if a desired UE is not pre-loaded into the mobile terminal or downloaded to the mobile terminal, the server-side may dynamically construct a desired UE and load the newly constructed desired UE into the mobile terminal for switching or updating. That is, the server-side may dynamically construct and recommend the suitable UE, together with bundled applications and user interface that fit the user's preferences, such as the user's location and user's liking, etc. Such UE construction and run-time replacement may be scene-adaptive and user-adaptive to significantly improve user experience.

On the other hand, if it determined the current UE does not need to be changed (610; No), or after the current UE is changed, the process 600 returns to 604 for continuing collecting and processing mobile sensing data.

In addition, the server-side may also select and/or recommend desired applications to the user/mobile terminal based on the sensing data and user behavior analysis. There may be a large number applications available online, and the user may be unable to know which application to use or which application is safe to use (i.e., no virus, etc.). The server-side may select desired applications based on certain pre-conditions and may incorporate these desired applications in the UEs.

The server-side may store in the UE database with large selection of UEs, and the data analytics unit 304 may automatically match the desired ones with the current scene of the user. The UE may also be built by the data analytic unit 304 based on the user behavior learning process via user's interaction with the mobile terminal 102 and feedback of scene knowledge, and may include desired applications in the selected UEs.

In other words, the server-side may recommend certain user interface and applications based on the sensing data and user behavior analysis, and may dynamically construct a UE with applications recommended and/or selected by the user suitable for the user's location and/or input.

Figure 7:
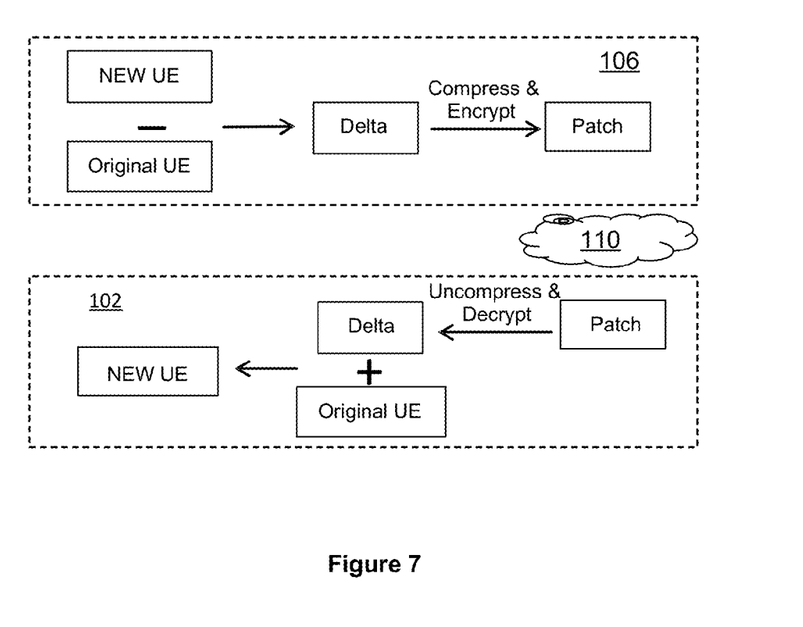
FIG. 7 illustrates an exemplary UE updating process consistent with the disclosed embodiments.

In certain embodiments, when loading a newly constructed UE to the mobile terminal, the new UE may be compressed and downloaded to the corresponding mobile terminal via a network or the cloud 110. In addition, when an updated UE is needed to update an existing UE that is currently on the mobile terminal 102, the server-side may use certain updating procedures to minimize the time and bandwidth needed to update the existing UE. FIG. 7 illustrates an exemplary UE updating process consistent with the disclosed embodiments.

As shown in FIG. 7, an original UE may be pre-loaded into the mobile terminal 102 and stored in the mobile terminal's file system. The original UE may be a software image built on a PC or on server 106. The server-side may also keep an original UE for the mobile terminal 102. That is, the original UE is provided or available in both mobile-side and server-side.

During operation, when the server-side dynamically builds an updated UE from the required operating system components plus the desired applications, user interface, and system configurations, the server-side may also determine whether there is an original UE available on the mobile terminal for the updated UE. In certain cases, a new UE image may differ from the original UE by a small delta in the form of new user interface change, some software configuration change, and/or bundling of different applications. Thus, the server-side may derive the difference (Delta) between the original UE and the updated UE (New UE).

Further, the service-side may compress and encrypt the Delta, and the compressed and encrypted delta between the New UE and the original UE may constitute a new UE image (Patch), which may have a significant reduction of image size. The time and data volume in loading a new UE from the cloud/server to the mobile terminal may also be significantly reduced. Thus, cloud-based UE storage and UE management may be achieved.

In other words, when a new UE set is made ready, the entire UE set is not transmitted to the mobile terminal directly, unless no original UE can be found. Instead, a patch for the new UE is prepared by first generating the difference between the new UE set and the original UE set, on which the new UE is based, and further by compressing and encrypting the difference data. The newly prepared patch is then made available, together with all the other similarly prepared patches, if any, as new UE selections on the server or a web-store for user to download.

On the mobile-side, after the user or mobile terminal 102 downloads the new UE (Patch), the new UE is uncompressed and decrypted to derive the Delta between the new UE and the original UE. Further, the mobile terminal locates the original UE on its file system (e.g., the flash memory file system or other file systems) and, based on the original UE and the Delta, recovers the corresponding software image of the updated UE (New UE). That is, the mobile terminal automatically converts the new UE image received from the server-side into a usable UE by the mobile terminal. If the original UE is not available or cannot be located, the updated UE image may be entirely downloaded.

By using the disclosed systems and methods, many advantageous applications can be implemented. For example, a mobile platform virtualization architecture may be implemented based on just-needed-device-virtualization which enables easy construction of user environments, easy switching of user environments, and running multiple instances of user environments simultaneously. In addition, based on mobile sensing data and data analytics, cloud-based user behavior learning can be implemented, and cloud-based mobile software management, including the capability to dynamically generate recommended user environment based on mobile sensing data processing and user behavior learning, can also be implemented.

By using the disclosed systems and methods, the mobile platform virtualization architecture can use mobile sensing data and user behavior learning to deliver cloud-supported scene-adaptive mobile user experience. The mobile platform virtualization allows multiple homogeneous or heterogeneous UEs to run simultaneously on a mobile terminal. Further, the disclosed systems and methods may take advantage of the ubiquitous high speed data network and the UE updating techniques to reduce UE image size, and UE selections can be sent to mobile device dynamically as well as downloaded manually upon user's selection, with or without recommendations.

Other applications, advantages, alternations, modifications, or equivalents to the disclosed embodiments are obvious to those skilled in the art.

What is claimed is:

1. A method for a mobile platform containing a mobile terminal having an operating system, comprising:
    virtualizing hardware components of the mobile terminal by a virtualization layer in the operating system;
    initializing a plurality of user environments (UEs) on the mobile terminal through the virtualization layer over the operating system, including a first current UE and a second current UE running independently in parallel on the mobile terminal, wherein the plurality of UEs share the same hardware components and are switched among one another based on one or more predetermined conditions without changing the operating system;
    collecting sensing data on certain parameters associated with operation of the mobile terminal;
    processing the sensing data to indicate at least one of the one or more predetermined conditions of the mobile terminal;
    determining whether the first current UE suits the at least one of the one or more predetermined conditions of the mobile terminal indicated by processing the sensing data; and
    when the first current UE does not suit the one or more predetermined conditions of the mobile terminal, switching the first current UE to a desired UE from the plurality of UEs;
    wherein processing the sensing data includes:
        forwarding the sensing data to a server in a cloud;
        providing a user behavior database in the server, including a learned database to match the sensing data;
        receiving an input of a user, including a label of an event created by the user, to facilitate a user behavior analysis, wherein the input is not user-specific and personal information of the user and private information of the user are not stored;
        performing the user behavior analysis based on the sensing data on the server;
        learning user behavior according to the user behavior analysis and the learned database; and
        updating the user behavior database in an adaptive mode during run-time.

2. The method according to claim 1, wherein:
    a UE includes a part of the operating system, bundled applications, application configurations, and user interfaces for setting up a software environment for a user; and
    the sensing data includes information on location, movement, and scene of the mobile terminal.

3. The method according to claim 1, further including:
    determining whether the first current UE suits the at least one of the one or more predetermined conditions of the mobile terminal based on the user behavior analysis;
    dynamically constructing the desired UE based on the at least one of the one or more predetermined conditions of the mobile terminal; and making the dynamically constructed desired UE available to the mobile terminal.

4. The method according to claim 3, further including:
downloading the desired UE from the server to the mobile terminal; and
storing the desired UE as part of the plurality of UEs on the mobile terminal.

5. The method according to claim 3, wherein making the dynamically constructed desired UE available further includes:
determining whether there is an original UE available on the mobile terminal corresponding to the desired UE;
deriving a difference between the original UE and the desired UE;
compressing and encrypting the difference into a UE patch; and
making the UE patch available to the mobile terminal.

6. The method according to claim 5, further including:
downloading the UE patch to the mobile terminal;
uncompressing and decrypting the UE patch to restore the difference;
locating the original UE on the mobile terminal;
obtaining the desired UE based on the original UE and the difference; and
storing the desired UE as one of the plurality of UEs on the mobile terminal.

7. The method according to claim 1, wherein:
the one or more predetermined conditions include a scene-based condition and location-based condition.

8. The method according to claim 1, wherein:
the first current UE is a home-place UE pre-loaded in the mobile terminal,
the desired UE is a work-place UE managed by the server for high reliability, and
the one or more predetermined conditions include a work-place wireless network ID indicated by the sensing data.

9. The method according claim 1, wherein:
when the mobile terminal is powered on or after reset, a processor of the mobile terminal executes a boot sequence to load software images of the operating system and the plurality of UEs;
the processor starts and configures a kernel of the operating system;
the processor performs a user space initialization process and starts a UE manager;
the UE manager is configured to control a start and a stop of the plurality of UEs and to maintain the plurality of UEs; and
the UE manager is configured to update one of the plurality of UEs when the first current UE and the second current UE are running on the mobile terminal.

10. The method according claim 1, wherein:
the first current UE is based on Linux and includes complete Android components;
the second current UE is based on Android; and
the first current UE runs in parallel with the second current UE on the mobile terminal.

11. A mobile platform, comprising:
a mobile terminal having a processor; and
an operating system running on the processor,
wherein the processor is configured to:
virtualize hardware components of the mobile terminal by a virtualization layer in the operating system;
initialize a plurality of user environments (UEs) on the mobile terminal through the virtualization layer over the operating system, including a first current UE and a second current UE running independently in parallel on the mobile terminal, wherein the plurality of UEs share the same hardware components and are switched among one another based on one or more predetermined conditions without changing the operating system;
collect sensing data on certain parameters associated with operation of the mobile terminal;
process the sensing data to indicate at least one of the one or more predetermined conditions of the mobile terminal;
determine whether the first current UE suits the at least one of the predetermined conditions of the mobile terminal indicated by processing the sensing data; and
when the first current UE does not suit the one or more predetermined conditions of the mobile terminal, switch the first current UE to a desired UE from the plurality of UEs;
wherein the mobile platform further comprises a server in a cloud configured to:
when the mobile terminal forwards the sensing data to the server, receive the sensing data forwarded from the mobile terminal;
provide a user behavior database in the server, including a learned database to match the sensing data;
receive an input of a user, including a label of an event created by the user, to facilitate a user behavior analysis, wherein the input is not user-specific and personal information of the user and private information of the user are not stored;
perform the user behavior analysis based on the sensing data;
learn user behavior according to the user behavior analysis and the learned database; and
update the user behavior database in an adaptive mode during run-time.

12. The mobile platform according to claim 11, wherein:
a UE includes a part of the operating system, bundled applications, application configurations, and user interfaces for setting up a software environment for a user;
the sensing data includes information on location, movement, and scene of the mobile terminal.

13. The mobile platform according to claim 11, wherein the server is further configured to:
determine whether the current UE suits the at least one of the one or more predetermined conditions of the mobile terminal based on the user behavior analysis;
dynamically construct the desired UE based on the at least one of the one or more predetermined conditions of the mobile terminal; and
make the dynamically constructed desired UE available to the mobile terminal.

14. The mobile platform according to claim 13, wherein the processor of the mobile terminal is further configured to:
download the desired UE from the server to the mobile terminal; and
store the desired UE as part of the plurality of UEs on the mobile terminal.

15. The mobile platform according to claim 13, wherein, to make the dynamically constructed desired UE available, the server is further configured to:
determine whether there is an original UE available on the mobile terminal corresponding to the desired UE;
derive a difference between the original UE and the desired UE;
compress and encrypt the difference into a UE patch; and
make the UE patch available to the mobile terminal.

16. The mobile platform according to claim 15, wherein the processor of the mobile terminal is further configured to:
- download the UE patch to the mobile terminal;
- uncompress and decrypt the UE patch to restore the difference;
- locate the original UE on the mobile terminal;
- obtain the desired UE based on the original UE and the difference; and
- store the desired UE as one of the plurality of UEs on the mobile terminal.

17. The mobile platform according to claim 11, wherein:
the one or more predetermined conditions include a scene-based condition and location-based condition.

18. The mobile platform according to claim 11, wherein:
- the current UE is a home-place UE pre-loaded in the mobile terminal,
- the desired UE is a work-place UE managed by the server for high reliability, and
- the one or more predetermined conditions include a workplace wireless network ID indicated by the sensing data.

* * * * *